United States Patent
Bouzit et al.

(10) Patent No.: US 8,851,491 B2
(45) Date of Patent: Oct. 7, 2014

(54) MECHANICALLY SELF-POWERED DRIVESHAFT CENTER BEARING HEIGHT ADJUSTMENT

(71) Applicant: Ford Global Technologies, LLC, Dearborn, MI (US)

(72) Inventors: Djamel Bouzit, Ann Arbor, MI (US); Bill Ickes, Northville, MI (US); Ariosto Mancini, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/691,703

(22) Filed: Nov. 30, 2012

(65) Prior Publication Data

US 2014/0151144 A1    Jun. 5, 2014

(51) Int. Cl.
*B60K 17/24* (2006.01)
*B23P 11/00* (2006.01)

(52) U.S. Cl.
CPC *B60K 17/24* (2013.01); *B23P 11/00* (2013.01)
USPC ............. 280/124.156; 180/376; 180/379

(58) Field of Classification Search
CPC ................. B60K 17/22; B60K 17/24
USPC ............ 180/376, 377, 379, 380, 360, 362; 280/124.156
See application file for complete search history.

(56) References Cited

U.S. PATENT DOCUMENTS

| | | | |
|---|---|---|---|
| 2,939,540 A | 6/1960 | Halberg | |
| 2,953,213 A | 9/1960 | Halberg | |
| 4,966,251 A | 10/1990 | Hirano | |
| 5,370,464 A | 12/1994 | Blahaa | |
| 5,562,179 A | 10/1996 | McAdam | |
| 5,749,659 A | 5/1998 | Nisley | |
| 6,345,680 B1 | 2/2002 | Hill | |
| 6,345,826 B1* | 2/2002 | Kurzeja et al. | 280/5.5 |
| 6,758,302 B2* | 7/2004 | Penzotti | 180/383 |
| 6,811,455 B2 | 11/2004 | Rodriguez | |
| 6,868,932 B1* | 3/2005 | Davis et al. | 180/292 |
| 6,959,932 B2* | 11/2005 | Svartz et al. | 280/5.514 |
| 7,500,788 B2 | 3/2009 | Joyner | |
| 8,070,365 B2 | 12/2011 | Hoppert | |
| 8,646,566 B1* | 2/2014 | Bouzit et al. | 180/376 |
| 8,657,059 B2* | 2/2014 | Yamada et al. | 180/312 |
| 2008/0021620 A1* | 1/2008 | Johansson et al. | 701/49 |

* cited by examiner

*Primary Examiner* — James English
(74) *Attorney, Agent, or Firm* — James Dottavio; MacMillan, Sobanski & Todd, LLC

(57) ABSTRACT

A link is configured to mechanically transfer movement sensed at an axle suspension assembly to a center bearing bracket for a vehicle driveshaft.

23 Claims, 7 Drawing Sheets

MECHANICALLY SELF-POWERED DRIVESHAFT CENTER BEARING HEIGHT ADJUSTMENT

TECHNICAL FIELD

The present disclosure relates to height adjustment mechanisms for vehicle driveshafts.

BACKGROUND

A vehicle driveshaft connects the transmission to a distant wheel axle. This is most commonly done in rear-wheel drive (RWD) and all-wheel drive (AWD) vehicles. The driveshaft can move vertically with respect to a vehicle frame during normal driving conditions. For example, as shown in FIGS. 1 and 2, the angular disposition of a forward section of the driveshaft rotates in different directions depending on the loading conditions of the vehicle. Driveshaft components, however, are designed to operate within a preferred angular range. Many vehicles with rear or all-wheel drive systems are designed for a standard payload so that the driveshaft is angularly disposed at a preferred position. Known suspension damping or performance characteristics can also influence this. Angle fluctuation outside of the design standard can cause objectionable vehicle shudder.

Some vehicles, such as pick-up trucks, have multi-piece drivelines with a center bearing support that sections the driveshaft into shorter tubes between Universal joints. The angle of a rear most section changes with axle height and the center bearing height, as shown in FIGS. 1 through 3.

Several types of angle fluctuation mitigation schemes are used in the industry to manage joint angles under different operating conditions. Some methods include: (i) shimming the axle to a suspension interface; or (ii) offering powered center bearing brackets or adapters to adjust the height. For example, U.S. Pat. No. 4,966,251 titled "Automotive Vehicle with Center Bearing of Propeller Shaft Assembly Variable in Position" discusses a pneumatic adjuster controlled through an electrically powered servo valve according to vehicle operating conditions. U.S. Pat. No. 6,345,680 titled "Electrically-Controlled Adjustable Height Bearing Support Bracket" discloses an electric motor that drives adjustment of the bearing support. Performance of these electrically powered systems can be limited to the narrow tuning range of known axle-suspension travel. Moreover, electrically driven systems are relatively expensive to implement and maintain, thus adding to the overall complexity and costs of vehicle manufacture and repair.

Shimming the driveshaft would not allow for a real-time or automatic adjustment of driveshaft position. For example, today driveshaft positions can be tailored to fit known loading conditions for a particular user. However, when the vehicle is operated outside of the tailored use the pre-set driveshaft position is less effective.

Therefore, it is desirable to have a real-time or load dependent, self-actuated, self-powered height adjustment mechanism for the vehicle driveshaft.

SUMMARY

The present disclosure addresses one or more of the above-mentioned issues. Other features and/or advantages will become apparent from the description which follows.

One advantage of the present disclosure is that a self-actuated or automatic, self-powered center bearing support mechanism will reduce or eliminate transient noise, vibration and hardness issues, such as shudder associated with driveshaft angular fluctuation. Height adjustments to the position of the driveshaft are automatically effectuated with changes in the vertical position of the other vehicle components, e.g., the suspension, rear axle or differential. Yet, the systems are self-powered and non-reliant on the vehicles electrical or mechanical power.

Other vehicle performance characteristics, e.g., ride and drivability can also be improved by enabling a self-actuated, self-powered height adjustment mechanism for the vehicle driveline. The self-powered design reduces costs and complexity. The self-powered systems can be purely mechanical thus not requiring any electronic control. The present disclosure teaches a cost effective solution to the aforementioned problem that is readily available for aftermarket installation or original equipment manufacturer installation.

One exemplary embodiment of the present disclosure relates to a link configured to mechanically transfer movement sensed at an axle suspension assembly to a center bearing bracket for a vehicle driveshaft.

Another exemplary embodiment of the present disclosure relates to a vehicle chassis, including: a vehicle frame; and a driveshaft mounted with respect to the frame by a self-actuated, self-powered height adjustment mechanism.

Another exemplary embodiment of the present disclosure relates to an automatic, mechanically self-powered vehicle driveshaft height adjustment mechanism, having: a cable link coupled to a suspension system at one end; and a movable bracket assembly coupled to the cable link at another end.

Another exemplary embodiment of the present disclosure relates to an automatic, mechanically self-powered vehicle driveshaft height adjustment mechanism, having: a height sensing system configured to sense displacement of a suspension system; and a link configured to engage the height sensing system at one end and engage a movable bracket assembly at another end.

Another exemplary embodiment of the present disclosure relates to a method of manufacturing a vehicle chassis, the method including: mounting a driveshaft with respect to a vehicle frame by a self-actuated, self-powered height adjustment mechanism.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

DETAILED DESCRIPTION

Figure 1:
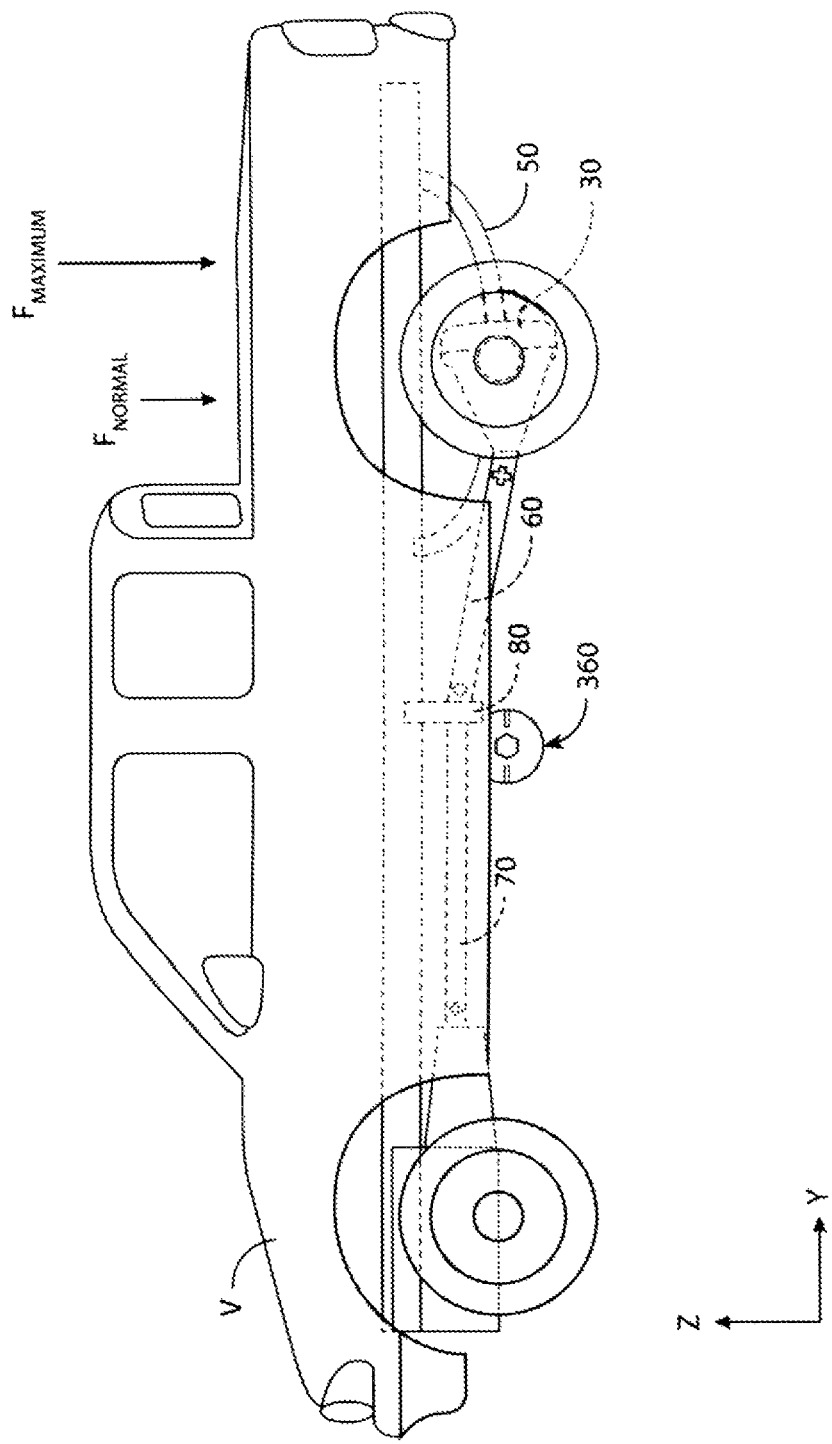
FIG. 1 is a side view of an exemplary vehicle with chassis undergoing a loading condition.

Referring to the drawings, wherein like characters represent examples of the same or corresponding parts throughout the several views, there are shown exemplary height adjustment mechanisms (or "HAMs") for a vehicle driveshaft. The illustrated HAMs are self-powered and do not rely on electrically control or power for performance. The HAMs are configured to automatically or self adjust a moveable bracket attached to a center bearing for the driveshaft when the vehicle is being used or loaded. HAMs perform the following functions: (a) detecting suspension system travel in a vertical direction when a vehicle is loaded; (b) translating suspension travel to a center bearing support mechanism for the driveshaft; (c) converting the suspension travel into predetermined center bearing height adjustment so as to improve the angular alignment of links in the driveshaft; and (d) moving or adjusting the vertical position of the center bearing height as needed. HAMs are also configured to reset the driveshaft to a design or standard height once the vehicle is unloaded in order to enable the driveshaft to be angularly disposed in a preferred configuration. Preferred angular dispositions between links of the driveshaft or joint angles are provided at any loading condition of the vehicle.

Several primary vehicle loading conditions are influential in the design of the driveshaft and center bearing support positions. Primary loading conditions include curb (or a parked, unloaded state), design (driving but loaded under a predetermined amount), design with loading above the predetermined amount, driving with a trailer tow attached, or driving with a 5$^{th}$ wheel trailer tow attachment. There are also an infinite numbers of loading conditions between these scenarios, at least to the maximum loading capacity for the vehicle. Accordingly, the center bearing support for the driveshaft should be able to move up to 20 mm in some applications.

Figure 2:
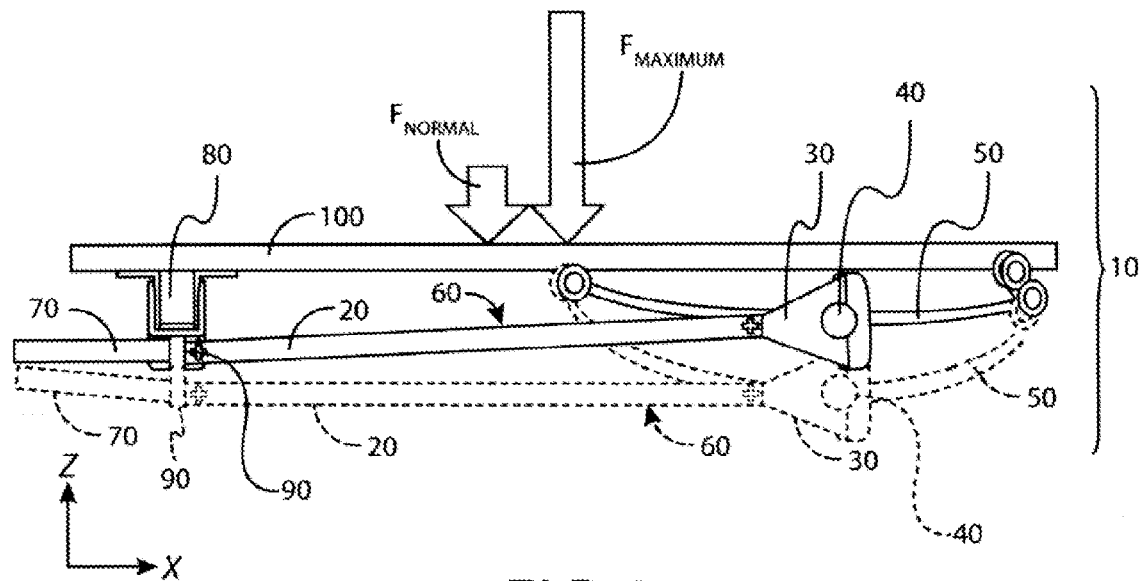
FIG. 2 is side view of the vehicle chassis of FIG. 1 under a first and second loading condition.
Figure 3:
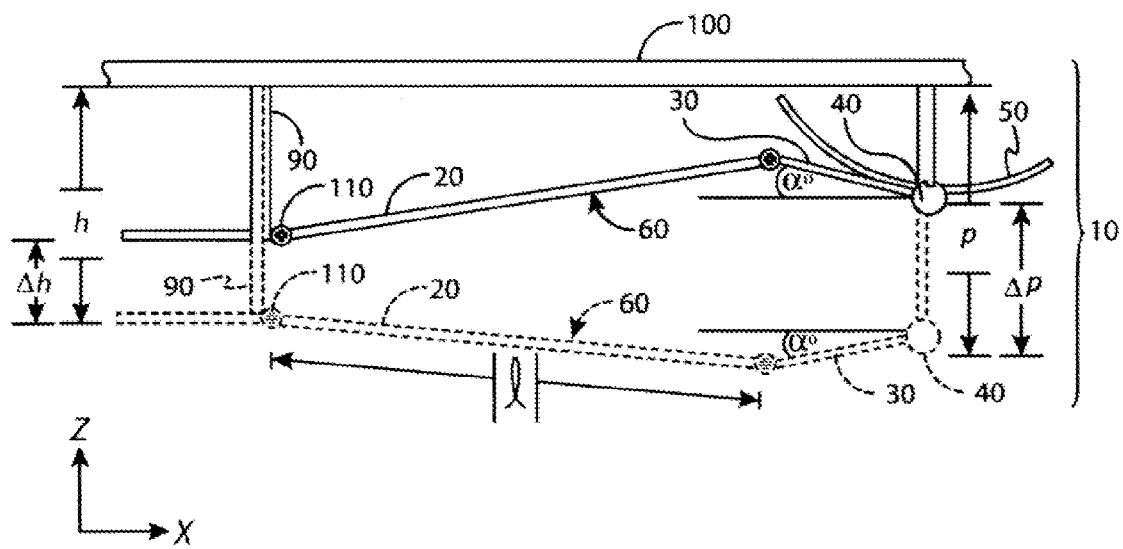
FIG. 3 is a free-body diagram of the chassis of FIG. 1.

With respect to FIGS. 1-3 a vehicle, v, includes a vehicle chassis 10 as shown in side view. The chassis 10 is subjected to two different loading conditions. In a first loading condition, $F_{Normal}$, the chassis 10 is loaded according to a normal or "design" configuration—i.e., under a predetermined amount. In a second loading condition, $F_{Maximum}$, the chassis 10 undergoes substantially larger loading, above the predetermined amount. The load may be, for example, a maximum loading capacity for the vehicle. As shown in FIG. 2, there is a vehicle driveshaft 20 attached to a differential 30 and axle 40 for a rear-wheel drive vehicle. Vehicle can be any type of vehicle including a rear wheel drive or all-wheel drive vehicle. Differential 30 is attached to a rear axle 40 and rear axle is attached to a suspension spring 50 or suspension system. In this configuration the suspension system 50 is attached to the axle 40. Driveshaft 20 is a multiple piece or multiple link driveshaft with a universal joint at each end of each piece. A rearward portion of the driveshaft 60 is attached to the differential 30 and rear axle 40 and a forward portion of a driveshaft 70 is attached to a cross-member in the vehicle frame 80 via a center bearing support member 90.

In the first loading condition, illustrated in FIG. 2, the driveshaft 20 is shown displaced at the center bearing support 90. The center bearing support 90 for the driveshaft is attached to cross-member 80 between two vehicle side rails 100. Under the second loading condition the rear axle 40 and differential 30 move vertically downward with respect to the Z axis. The driveshaft 20 moves with the differential 30. Also, the center bearing support 90 moves downward with respect to the vertical or z-axis, as shown.

Illustrated in FIG. 3 is a free-body diagram of the vehicle chassis 10 of FIG. 2. The free-body diagram shows the driveshaft 20. The driveshaft 20 is subjected to the same loads schematically represented in FIG. 2—$F_{Normal}$ and $F_{Maximum}$. As shown in FIG. 3, the two-tube linkage of the driveshaft 20 changes angular positions under each loading condition. Differential 30 is rotated at a positive angle with respect to a longitudinal or horizontal plane of the vehicle frame 100, as indicated by alpha, $\alpha$. In this arrangement alpha is approximately 20 degrees clockwise with respect to the horizontal plane of the vehicle frame 100 or the longitudinal axis of the vehicle, x-axis. The link 60 of driveshaft is also torque upward or counterclockwise with respect to the vehicle frame 100. The universal joint angle is formed by axle rotation and driveshaft rotation. In this configuration the driveshaft 20 is in a design or in-use position. Therefore, the vehicle is under normal loading conditions.

Driveshaft 20 is supported by a center bearing support 90 that is schematically illustrated in FIG. 3. Center bearing support 90 is displaced by mechanism when the driveshaft 20 or vehicle undergoes load $F_{Maximum}$. Displacement of center bearing support 90 is shown as $\Delta h$ in the diagram of FIG. 3. In a second position the vehicle is parked and the driveshaft undergoes what is commonly referred to as a "curb" or non-loaded position. As shown, center link 60 of driveshaft is torque approximately 20 degrees clockwise with respect to the vehicle frame, or the x-axis. Link 70 is torque approximately 20 degrees counterclockwise with respect to the vehicle frame 100. Between each link in the driveshaft 20 there are universal joints (or "U-joints") 110. The driveshaft 20 is attached to the spring suspension system 50 or leaf spring via axle 40. A change in pressure at the suspension system 50 changes the vertical position of the rear differential 30 and driveshaft 20. Change in differential position caused by a change in pressure at the suspension system 50 is denoted by $\Delta p$ in this diagram. As taught herein, adjustment of center bearing support height, $\Delta h$, with loading changes, $\Delta p$, allows the U-joint angle to be maintained at an optimal desired value.

Figure 4:
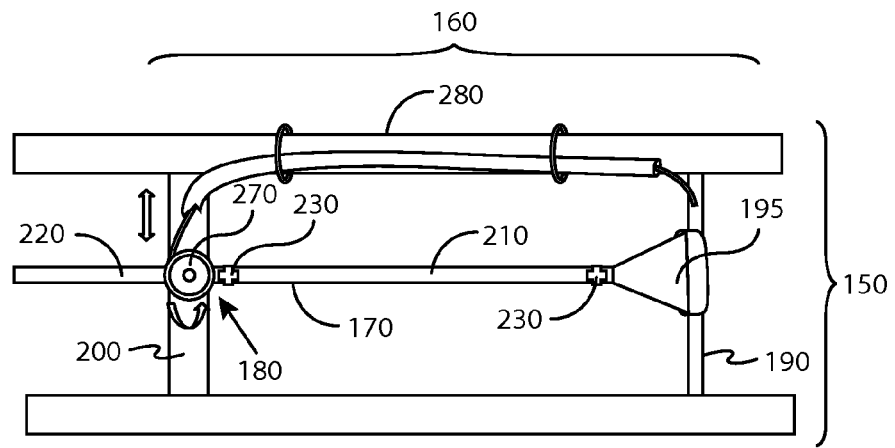
FIG. 4 is a top view of a vehicle chassis with a height adjustment mechanism according to an exemplary embodiment of the present invention.
Figure 5:
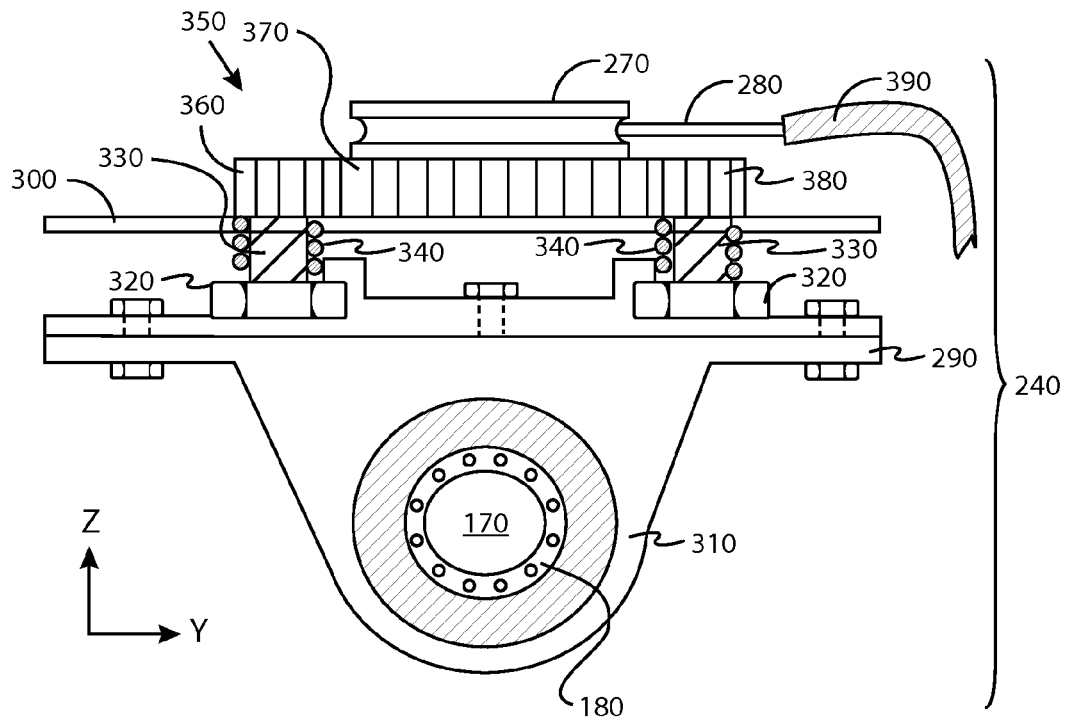
FIG. 5 is a side view of a movable bracket assembly for the driveshaft, compatible with the height adjustment mechanism of FIG. 4 using a cable and pulley system.

Turing now to FIG. 4, there is shown another vehicle chassis 150 with another exemplary height adjustment mechanism (or "HAM") 160 shown in top view. The chassis 150 includes HAM 160 configured to alter a vertical position of a driveshaft 170 at a center bearing support 180 (as also shown in FIG. 5) based on changes in the vertical position of the driveshaft 170 at a rear axle 190. The HAM 160 is self-powered and does not rely on any other power source such as, e.g., a battery or pneumatic source. In this embodiment, chassis 150 includes driveshaft 170 attached to the rear axle 190 at one longitudinal location and attached to a cross-member 200 in a middle-section of the vehicle frame at another longitudinal location (e.g., as shown in FIG. 4). At cross-member driveshaft 170 is attached to the vehicle frame via a center mounted bearing support 120. Driveshaft tubular links 210, 220 are interconnected through U-joints 230.

In the embodiment shown in FIG. 4, the center-mounted bearing support 180 is included in a movable bracket assembly (or "MBA") 240, as shown in FIG. 5. In this embodiment link 280 is a cable. Link 280 configured to mechanically transfer movement sensed at axle suspension assembly (e.g., 50 as shown in FIGS. 2 and 3) to the center bearing bracket (e.g., MBA 240) for the vehicle driveshaft 170. The link 280 of FIG. 4 with guide sleeve can be routed from the axle 190 in the rear of the vehicle to the MBA 240 in the middle of the vehicle without need of a pulley. Or, additional pulleys besides 270 can be added to guide the link 280 in a longitudinal direction with respect to the vehicle and then in a lateral direction with respect to the vehicle, as shown. Rear axle 190 is attached to link 280.

Now with respect to FIG. 5, there is shown therein the MBA 240 of FIG. 4. MBA 240 is a two-part assembly having a bottom portion 290 that is movable and top portion 300 that is a base bracket, fixable to the vehicle cross-member (200 as shown in FIG. 4). MBA 240 is configured to automatically move the vertical position of the bottom portion or surface 290 of the MBA 240 with changes in the vertical position of the rear axle 190 (as shown in FIG. 4). As shown in FIG. 5, the bracket assembly 240 includes a brace 310 attached to the center bearing 180 for the driveshaft 170. Brace 310 connects the bottom portion 290 of the bracket assembly 240. Bottom portion 290 of the bracket assembly 240 is attached to a threaded nut 320 on each side. Each portion 290, 300 is composed of metal in this embodiment, however in other embodiments, portions can be composed of composites or hard polymers, for examples.

Two drive screws 330 are used in the MBA 240 in this arrangement, as shown in FIG. 4. Each drive screw 330 is threaded and mounted with respect to a return spring 340. Return springs 340 are configured to apply a resistive force or a positive force when the spatial distance between the top portion 300 and the bottom portion 290 of the MBA 240 decreases.

As also shown, in FIG. 5 a gear train 350 is included in the MBA 240. In this embodiment, the gear teeth of the gears in the gear train 350 are designed so that the bottom portion 290 of MBA 240 moves 1 mm for every 10 mm of travel by the suspension system, or at a ratio of 1:10. Gear train and HAM components can be designed to produce other ratios. In the illustrated embodiment of FIG. 5, gear train 350 includes three gears 360, 370 and 380. Two driven gears 360, 380 are attached to the drive screws 330 on the outer ends of the gear train 350. Each drive screw 330 is fixed with respect to the driven gears 360, 380. A drive gear 370 is centrally positioned with respect to the two driven gears 360, 380. Drive gear 370 is attached to pulley 270. Pulley 270 is configured to engage (cable) link 280. Link 280 is fixed to pulley 270. Cable link 280 is fixedly attached to the rear axle 190 and/or differential 195 (shown in FIG. 4) so that vertical movement or downward movement of the differential and driveshaft 170 at the rear axle causes displacement of link. Cable link 280 can be fixedly attached to rear axle 190 via a fastener, for example as discussed hereinbelow with respect to FIG. 7. Movement of the cable link 280 causes rotation of pulley 270, as shown in FIG. 4, which rotates drive gear 370. In this embodiment, the link 280 is protected by a sheath 390 or guide sleeve, as shown.

Figure 6:
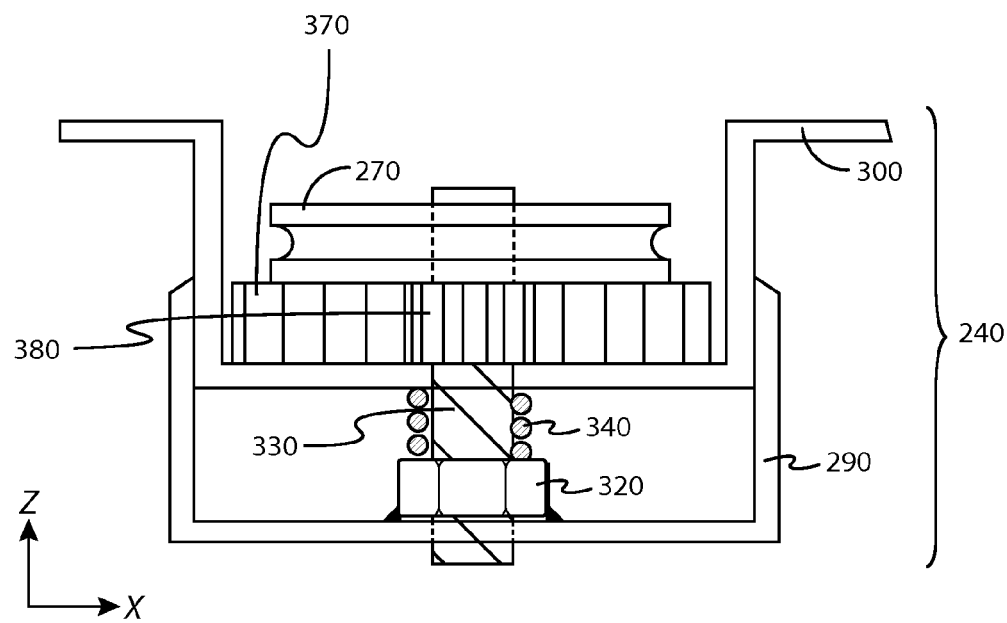
FIG. 6 is another side view of the movable bracket assembly of FIG. 5.

A side view of the MBA 240 of FIGS. 4-5 is shown in FIG. 6. The side view shows the MBA 240 sections in further detail. Top portion 300 is attachable to the frame body or cross-member 200, as shown in FIG. 4. Bottom section 290 of FIG. 6 is attached to the driveshaft 170 through base brace 310. Drive screw 330 is threaded through nut 320 that is attached to the bottom surface or bottom section 290 of the MBA 240.

Figure 7:
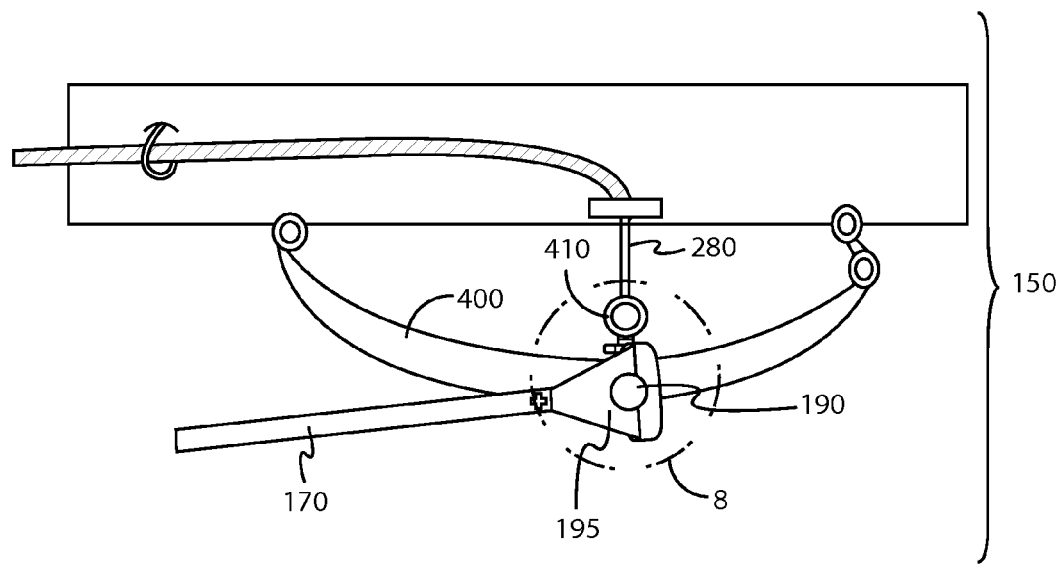
FIG. 7 is a side view of the axle height adjustment (or transference) mechanism of FIG. 4 under a loading condition.
Figure 8:
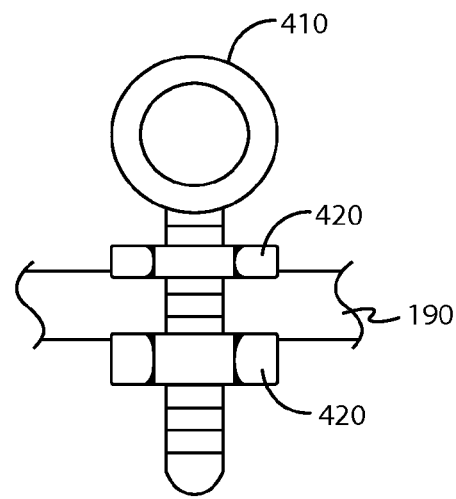
FIG. 8 is a partial cut-away side view of a fastener used with the axle height adjustment mechanism of FIG. 7.

Attachment between the rear axle 190 and link 280 is shown in FIG. 7. A partial side view is shown of the vehicle chassis 150 of FIG. 4. Suspension spring 400 is attached to rear axle 190. Cable link 280 extends between the MBA 240, as shown in FIGS. 5-6, and a fastener 410, as shown in FIG. 7. In this embodiment, fastener 410 includes an eye screw threaded through and fixedly attached to the rear axle 190. The driveshaft 170 and differential 195 are shown angularly disposed with respect to the suspension system 400. Under load the frame is lowered thereby compressing the suspension springs and reducing the distance between the vehicle frame and axle. Attachment between the eye screw 410 and rear axle 190 is also highlighted in FIG. 8. Eye screw 410 is threaded so as to adjust cable tension at the rear axle 190. Two lock nuts 420 are included so as to secure the eye screw 410 to rear axle 190. The fastener 410 of FIG. 7 is compatible with the MBA 240, discussed FIGS. 4-6. For example, the MBA 240 can be incorporated or linked to the fastener 410 illustrated in FIGS. 7 and 8.

Figure 9:
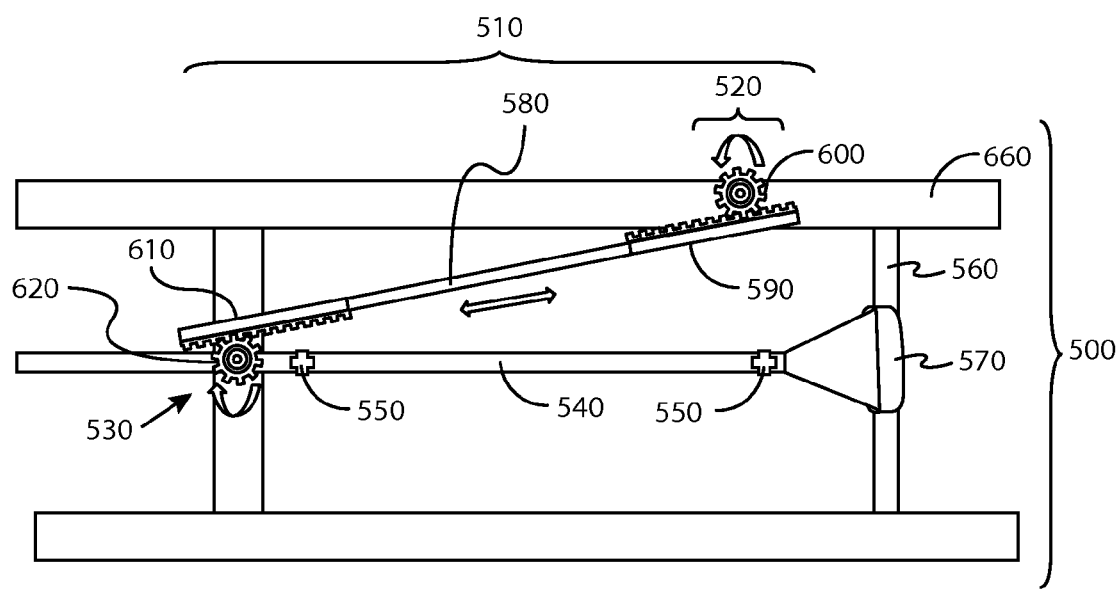
FIG. 9 is a top view of a vehicle chassis with another height adjustment mechanism according to another exemplary embodiment of the present invention.

Now turning to FIG. 9, there is shown therein top view of another vehicle chassis 500. Vehicle chassis 500 includes a different height adjustment mechanism or HAM 510. HAM 510 is an automatic, self-powered as well in that components of HAM are configured to move when the vehicle is in use or undergoing loading without the use of a power source. In this embodiment, HAM 510 includes a height sensing system, HSS, 520 that is linked through a pinion gear to a movable bracket assembly, MBA 530. A driveshaft 540 has multiple links connected through U-joints 550. Driveshaft 540 is positioned at another longitudinal location with respect to a rear axle 560 and differential 570. Link 580 in this embodiment is a dual rack link configured to engage two different pinion gears at each end. One end of the link 580 includes a rack 590 configured to engage a driving pinion gear 600 at or proximate to the rear axle 560 and another end of link includes a rack 610 configured to engage a driven pinion gear 620 at a center section of the vehicle.

Figure 10:
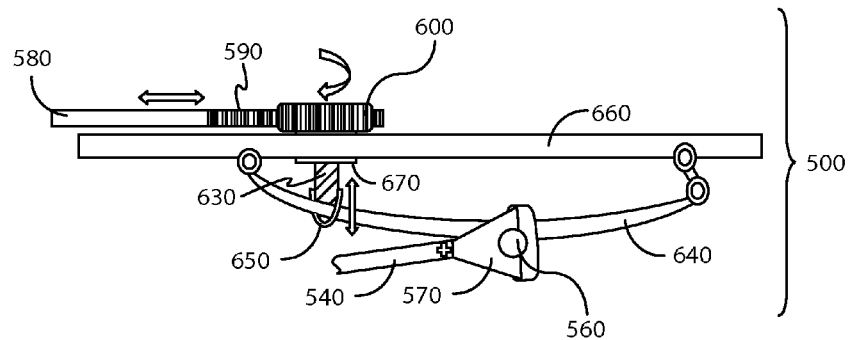
FIG. 10 is a side view of a height sensing system for use with the height adjustment mechanism of FIG. 9.
Figure 11:
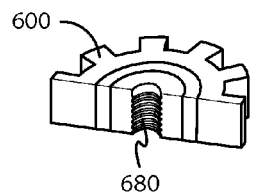
FIG. 11 is a perspective view of the driving gear of FIG. 10.

Shown in FIG. 10 is a side view of a height sensing system, or "HSS" 520. HSS 520 in this embodiment includes a support shaft 630 that is directly attached to a suspension system 640 through a wire or tie 650. Frame rail 660 is shown in this view. Support shaft 630 is a threaded screw that has threads at a top end so as to be compatible with driving gear 600 for the HSS 520 of FIG. 9. Frame rail 660 includes a threaded nut 670 compatible with the support shaft 630. As the driving gear 600 rotates it engages the rack 590 in link 580 moving link rearward with respect to the vehicle, or toward rear axle 560. In this way, height adjustments in the rear axle 560 are detected by the HSS 520. Driving gear 600 includes a plurality of teeth configured to engage the rack 590 of link 580. In FIG. 11, internal threads 680 in a driving gear 600 of the HSS are shown in perspective view.

Figure 12:
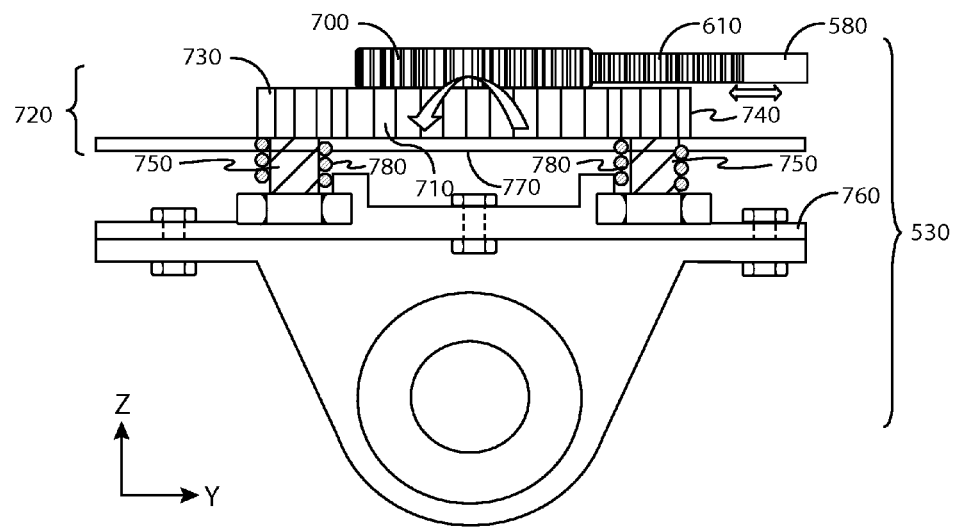
FIG. 12 is a side view of a movable bracket assembly for the height adjustment mechanism of FIG. 10 using the rack and pinion system.

In FIG. 12, there is shown a side view of the MBA 530 of FIG. 9. In this arrangement, MBA 530 includes a driven gear 700 at the top of the MBA 530. Driven gear 700 is configured with teeth to engage rack 610 on the link. Driven gear 700 is also attached to another driving gear 710 in a gear train 720 of the MBA 530. In this embodiment, gear train 720 includes three different gears 710, 730 and 740. Two gears 730, 740 are fixed to a drive screw 750. Each drive screw 750 is attached to a bottom portion 760 of the bracket assembly 530. The bottom portion 760 or section of the MBA moves vertically downward with clockwise rotation of a driven screw on one side and downward with counterclockwise rotation of a different driven screw at the other side. As shown, movement along the z-axis is indicated by arrow, A. Driven gear 700 turns counterclockwise in this embodiment with respect to the z-axis. A shaft 770 is attached to the driven (pinion) gear 710. Two return springs 780 are included in the MBA 530 of FIG. 12. Return springs 780 are journaled to drive screws 750. Return springs 780 are configured to apply a positive force against portion 760 of the MBA 530 upon compression or when bottom section 760 and top section (not shown) are more closely positioned with respect to each other. In this arrangement, return springs 780 are coil springs but in other embodiments return springs can be different springs, such as for example, a leaf spring, rotational spring or non-spring devices such as an air bladder or strut.

Figure 13:
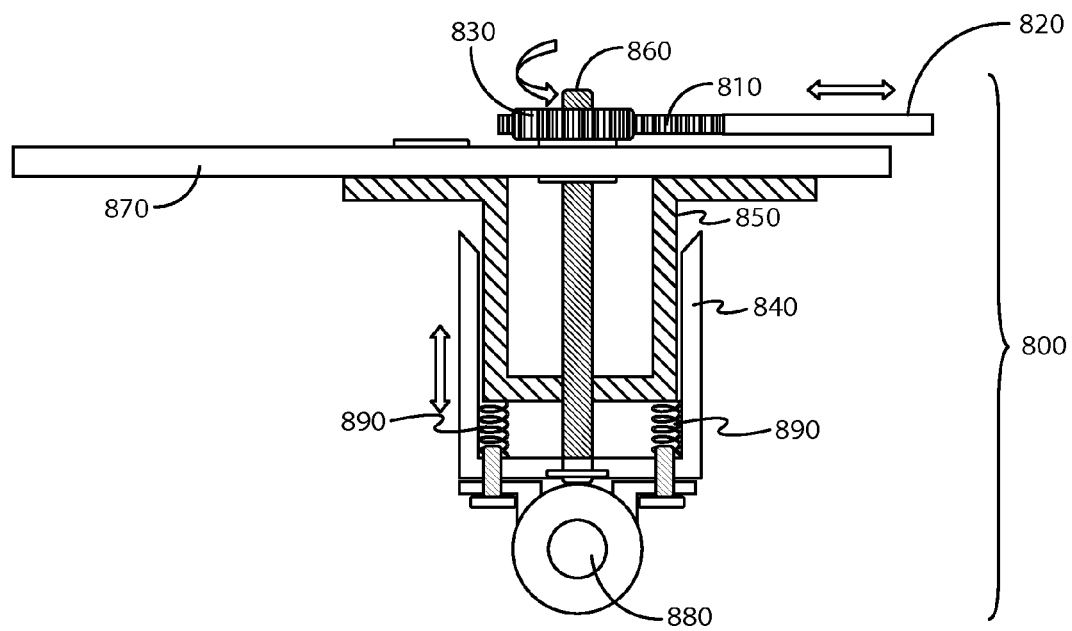
FIG. 13 is a side view of an alternative movable bracket assembly compatible with the height adjustment mechanism of FIG. 10.

In FIG. 13, there is shown an alternative embodiment of a movable bracket assembly or an "MBA" 800. The MBA 800 is at least compatible with the HAMs of FIGS. 9-11. As shown, MBA 800 is configured to engage a rack 810 in a link 820. The rack 810 intermeshes with a driven (pinion) gear 830 at the top of the MBA 800. MBA 800 is a two-part bracket assembly having portion 840 and portion 850. Portion 840 is movable with respect to portion 850. Driven gear 830 is attached to a drive screw 860 configured to engage portion 850 and portion 840 of the MBA. Portion 850 is fixed to a vehicle frame 870 and is not configured to move with respect to the vehicle frame; portion 840 is configured to move with respect to the vehicle frame. Driveshaft 880 is shown attached to portion 840 of MBA 800. Both portion 840 and portion 850 is threaded so that turns of the drive screw 860 move portion 840 with respect to portion 850. Two return springs 890 are included in this assembly 800. Driveshaft 880 is attached to portion 840 of the MBA 800 via fasteners shown in the side view of FIG. 13. MBA 800, shown in FIG. 13, also enables a self-powered HAM for altering an angular disposition of linkages in a multi-portion driveshaft 880.

Next, discussed are exemplary methods of manufacturing vehicle chassis that include automatic, self-powered height adjustment mechanisms for the driveshaft. One method includes mounting a driveshaft with respect to a vehicle frame by a mechanically, self-powered height adjustment mechanism, e.g. 160 or 510 as shown in FIGS. 4 and 9, respectively. Driveshaft can be mounted, for example, through a movable bracket assembly, such as 240 shown in FIG. 5. Fasteners such as a nut and bolt can be used for coupling or mounting the driveshaft to the vehicle frame.

One version of the above method of manufacturing includes coupling a link in the height adjustment mechanism to a suspension system at one end; and coupling the link to a movable bracket assembly at another end. This configuration is illustrated in FIGS. 4-8. In one embodiment, the link is coupled to a pulley in the movable bracket assembly and a gear train is added to the movable bracket assembly. The gear train includes a gear is configured to rotate with the pulley, e.g., 370 as shown in FIG. 5. The method can further include coupling a drive screw to another gear in the gear train at one end; and engaging the drive screw with a threaded movable bracket at another end. The method of manufacturing can also include adding a return spring to the movable bracket assembly between a driveshaft and the vehicle frame, e.g., 340 as shown in FIG. 5.

In another embodiment of the aforementioned method of manufacturing, the method includes adding a height sensing system configured to sense displacement of a suspension system. Such a HSS is illustrated in FIG. 10 for example. The method further includes configuring the link to engage the height sensing system at one end and engage a movable bracket assembly at another end. The method includes, in one embodiment, coupling a support to the suspension system (640 as shown in FIG. 10); threading the support at one end; threading a driven gear so as to receive the threaded end of the support (as shown in FIG. 11); and configuring the driven gear to engage a rack in the link (as shown in FIGS. 10-11). Another driven gear can be configured to engage another rack in the link at the movable bracket assembly, as shown in FIG. 12. The movable bracket assembly is configured with the second driven gear in the gear train to engage a second rack in the link. A drive screw is coupled to another gear in the gear train at one end; and the drive screw is configured to engage a threaded movable portion of the bracket at another end. This embodiment is shown in FIG. 12.

Another version of the method for building the movable bracket assembly includes configuring another driven gear to engage another rack in the link, coupling a driven gear to a drive screw; and configuring the drive screw to engage a threaded movable portion of the bracket at another end, as shown for example in FIGS. 5-6. That version of the height adjustment mechanism also requires the step of adding a return spring to the movable bracket assembly between a driveshaft and the vehicle frame, as shown.

Those familiar with the art to which this invention relates will recognize various alternative designs and embodiments for practicing the invention within the scope of the appended claims.

We claim:

1. A vehicle chassis, comprising:
    a vehicle frame;
    a driveshaft supported at a first end by a vehicle frame mounted driveshaft center support and at an opposite end supported by a vehicle suspension;
    a self-actuated, self-powered height adjustment mechanism including a link configured to move with height changes in the suspension, said movement mechanically transmitted through the link to move the center support to change a height of the first end.

2. The chassis of claim 1, wherein the height adjustment mechanism, includes:
    the link being secured to the suspension system at one end; and
    the center support coupled to another end of the link.

3. The chassis of claim 2, wherein the height adjustment mechanism includes:
    a pulley coupled to the link;
    a gear train having a gear configured to rotate with the pulley; and
    a drive screw fixed to another gear in the gear train at one end and configured to engage a threaded movable portion of the center support at another end.

4. The chassis of claim 3, wherein the height adjustment mechanism includes:
    a return spring between the driveshaft and vehicle frame.

5. The chassis of claim 2, wherein the height adjustment mechanism is configured to vertically displace the center support at a ratio of 1:10 for suspension system vertical movement.

6. The chassis of claim 1, wherein the height adjustment mechanism, includes:
    a height sensing system having a cable with one end mounted to the suspension; and an opposite end of the cable configured to engage the center support to adjust the height of the first end by movement of the cable.

7. The chassis of claim 1, wherein the height adjustment mechanism includes:

a support shaft coupled to the suspension, the support shaft including a threaded end; and a first driven gear having internal threads configured to receive the threaded end of the support shaft;

wherein the link includes a first rack configured to engage the first driven gear.

8. The chassis of claim 7, wherein the height adjustment mechanism includes:

a gear train having a second driven gear configured to engage a second rack in the link; and a drive screw fixed to another gear in the gear train at one end and configured to engage a threaded movable portion of the bracket at another end.

9. The chassis of claim 8, wherein the height adjustment mechanism includes:

a return spring between the driveshaft and vehicle frame.

10. The chassis of claim 7, wherein the height adjustment mechanism includes:

a second driven gear configured to engage a second rack in the link and fixed to a drive screw;

wherein the drive screw is configured to engage a threaded movable portion of the center support at another end.

11. A method of manufacturing a vehicle chassis, comprising:

supporting a first end of a driveshaft with respect to a vehicle frame with a driveshaft center support, and supporting an opposed end of the driveshaft by a vehicle suspension;

mounting a mechanical link so that movement in the rear suspension automatically self-powers movement of the link to move the center support to change a height of the first end.

12. The method of claim 11, further comprising:
coupling the link to the suspension at one end; and
coupling the link to the center support at another end.

13. The method of claim 12, further comprising:
coupling the link to a pulley in the center support;
adding a gear train to the center support and configuring one driving gear in the gear train to rotate with the pulley;
coupling a drive screw to another driven gear in the gear train at one end; and
engaging the drive screw with a threaded movable bracket at another end.

14. The method of claim 13, further comprising:
adding a return spring to the center support between the driveshaft and the vehicle frame.

15. The method of claim 12, further comprising:
adding a height sensing system having a cable with one end mounted to the suspension; and an opposite end of the cable engaging the center support to adjust the height of the center support by movement of the cable.

16. The method of claim 11 further comprising:
coupling a support shaft to the suspension system;
threading the support shaft at one end;
threading a first driven gear so as to receive the threaded end of the support shaft; and configuring the first driven gear to engage the link at a first rack of the link.

17. The method of claim 16, further comprising:
configuring a second driven gear in a gear train to engage a second rack in the link; and
coupling a drive screw to another gear in the gear train at one end; and
configuring the drive screw to engage a threaded movable portion of the center support at another end.

18. The method of claim 17, further comprising:
adding a return spring to the center support between the driveshaft and the vehicle frame.

19. The method of claim 16, further comprising:
configuring a second driven gear to engage a second rack in the link;
coupling the second driven gear to a drive screw; and
configuring the drive screw to engage a threaded movable portion of the center support at another end.

20. A vehicle chassis, comprising:
a vehicle frame;
a driveshaft mounted with respect to the frame by a self-actuated, self-powered height adjustment mechanism, the height adjustment mechanism including a link coupled to a suspension system at one end, and a movable bracket assembly coupled to another end of the link; and
wherein the movable bracket assembly includes:
a pulley coupled to the link;
a gear train having a gear configured to rotate with the pulley; and
a drive screw fixed to another gear in the gear train at one end and configured to engage a threaded movable portion of the bracket at another end.

21. The chassis of claim 20, wherein the movable bracket assembly includes:
a return spring between the driveshaft and vehicle frame.

22. A method of manufacturing a vehicle chassis, comprising:

mounting a driveshaft with respect to a vehicle frame by an automatic, mechanically self-powered height adjustment mechanism;

coupling a link in the height adjustment mechanism to a suspension system at one end;

coupling the link to a movable bracket assembly at another end;

coupling the link to a pulley in the movable bracket assembly;

adding a gear train to the movable bracket assembly and configuring one driving gear in the gear train to rotate with the pulley;

coupling a drive screw to another driven gear in the gear train at one end; and engaging the drive screw with a threaded movable bracket at another end.

23. The method of claim 22, further comprising:
adding a return spring to the movable bracket assembly between the driveshaft and the vehicle frame.

* * * * *